United States Patent
Kim et al.

(10) Patent No.: US 8,380,082 B2
(45) Date of Patent: Feb. 19, 2013

(54) METHOD AND APPARATUS FOR OUTPUTTING VISIBILITY FRAME IN VISIBLE LIGHT COMMUNICATION SYSTEM PROVIDING MULTIPLE COMMUNICATION MODES

(75) Inventors: Do-Young Kim, Yongin-si (KR); Eun-Tae Won, Seoul (KR); Tae-Han Bae, Seongnam-si (KR); Sun-Gi Gu, Yongin-si (KR); Jae-Seung Son, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 347 days.

(21) Appl. No.: 12/886,300

(22) Filed: Sep. 20, 2010

(65) Prior Publication Data

US 2011/0069971 A1    Mar. 24, 2011

(30) Foreign Application Priority Data

Sep. 19, 2009  (KR) .................... 10-2009-0088779

(51) Int. Cl.
*H04B 10/00* (2006.01)

(52) U.S. Cl. ................... 398/172; 398/127; 398/128

(58) Field of Classification Search .................... 398/66, 398/67, 69, 70, 78, 89, 99, 154, 172, 127, 398/128

See application file for complete search history.

(56) References Cited

U.S. PATENT DOCUMENTS

| 7,668,467 B2 * | 2/2010 | Naoe et al. ................. 398/202 |
| 8,208,818 B2 * | 6/2012 | Sasai ........................... 398/185 |
| 2010/0327764 A1 * | 12/2010 | Knapp ......................... 315/250 |
| 2012/0230696 A1 * | 9/2012 | Pederson et al. ........... 398/115 |

* cited by examiner

*Primary Examiner* — Dalzid Singh
(74) *Attorney, Agent, or Firm* — The Farrell Law Firm, P.C.

(57) ABSTRACT

A method and apparatus are provided for outputting a visibility frame for a communication link connection during a communication link release in a Visible Light Communication (VLC) system. A transmitting-side VLC device determines a visibility frame output type according to a communication mode to be performed. The communication mode and the visibility frame output type are transmitted to a receiving-side VLC device. The receiving-side VLC device is communicated with according to the communication mode and it is determined whether a communication link is released while performing communication according to the communication mode. When the communication link is released, outputting a visibility frame according to the visibility frame output type.

20 Claims, 15 Drawing Sheets

| syntax | size | notes |
| --- | --- | --- |
| Version number | 2 bit | |
| Frame type | 1 bit | |
| Service type (1101) | 2 bit | 00 : unicast<br>01 : broadcast<br>11 : multicast |
| VF info type (1102) | 3 bit | 000 : Tx<br>001 : Rx<br>011 : both |
| Src address | 8 bit | |
| Destination address | 8 bit | |
| Num PDUs per frame | 8 bit | |
| Sequence number | 12 bit | |
| Secure | 1 bit | |
| ack/nack | 2 bit | |
| Frame sub-type | 10 bit | |
| Reserved | 1 bit | |

FIG.11A

| syntax | size | notes |
|---|---|---|
| Burst mode | 1 bit | |
| Preamble | 4 bit | |
| Service type (1101) | 2 bit | 00 : unicast<br>01 : broadcast<br>11 : multicast |
| VF info type (1102) | 3 bit | 000 : Tx<br>001 : Rx<br>011 : both |
| Length of MAC payload | 16 bit | |
| Channel number | 3 bit | |
| Data rate | 4 bit | |
| Reserved | 1 bit | |

FIG.11B

METHOD AND APPARATUS FOR OUTPUTTING VISIBILITY FRAME IN VISIBLE LIGHT COMMUNICATION SYSTEM PROVIDING MULTIPLE COMMUNICATION MODES

PRIORITY

This application claims priority under 35 U.S.C. §119(a) to a Korean Patent Application filed in the Korean Intellectual Property Office on Sep. 19, 2009 and assigned Serial No. 10-2009-0088779, the entire disclosure of which is incorporated herein by reference.

BACKGROUND OF THE INVENTION

1. Field of the Invention

The present invention relates generally to a Visible Light Communication (VLC) system which supports unicast, multicast, and broadcast communication modes, and more particularly, to a method and apparatus for outputting a visibility frame for a communication link connection during a communication link release in a VLC system.

2. Description of the Related Art

With the improvement of luminous efficiency and competitive prices, Light Emitting Diodes (LEDs) have been widely used not only in special lighting markets for mobile devices, displays, vehicles, traffic lights, advertising boards, etc., but also in general lighting markets for fluorescent lamps, incandescent lamps, etc. Further, interest has increased in an optical wireless technology, which is complementary to a Radio Frequency (RF) technology, due to the exhaustion of RF band frequencies, the possibility of interference between various wireless communication techniques, the increased demand for communication security, the advent of ubiquitous super-high speed communication environments in a $4^{th}$ Generation (4G) wireless technology, and the like. Accordingly, research on VLC using LEDs is being conducted.

FIG. 1 illustrates a general VLC system. The general VLC system includes a light source 10 and a VLC terminal 20. The light source 10, which includes LEDs or Laser Diodes (LDs), serves as an illumination and transmits and receives data using visible light. The VLC terminal 20 is equipped with a visible light transmission/reception module, and transmits and receives data to and from the light source 10. The VLC terminal 20 may be a mobile terminal, such as a cellular phone or a Personal Digital Assistant (PDA), or may be a fixed terminal of a desktop type. The VLC system may be more effectively used when combined with other systems using a wired or wireless communication medium.

Generally, a plurality of light sources 10 may be installed for VLC. When a plurality of light sources are installed at regular intervals, substantial service areas provided by the light sources may appear as three possible cases as shown in FIGS. 2A to 2C. FIGS. 2A to 2C illustrate service areas provided by two light sources. Service areas provided by light sources 31 and 33 may overlap each other as shown in FIG. 2A, may contact each other at their boundaries as shown in FIG. 2B, or may be separated from each other so that a non-service area is present as shown in FIG. 2C.

When providing a unicast, multicast or broadcast communication service to multiple user terminals using VLC, the multiple user terminals may be located in a service area provided by one light source and each terminal may receive the same or individual data. In VLC, the transmission and reception of data can be smoothly performed when communication links of a transmitting side and a receiving side are aligned in both directions due to a characteristic of a transmission medium. Even in one-way communication, the communication links should be formed so as to accurately direct a visible light signal generated from a visible light transmitter of the transmitting side to a visible light receiver of the receiving side. However, terminals that receive data from a light source may encounter disconnected communication links or an improperly transmitted visible light signal, due to external environment factors, movement of the terminals, obstacles, etc. Moreover, when there are a plurality of terminals that receive data from one light source, a communication link connection may be released from one of the plurality of terminals.

SUMMARY OF THE INVENTION

The present invention has been made to address at least the above problems and/or disadvantages and to provide at least the advantages described below. Accordingly, an aspect of the present invention provides a method and apparatus for outputting a visibility frame for a communication link connection when a communication link is disconnected or when a communication link connection is released due to an error of a transmission signal, in a VLC system that can provide unicast, broadcast, and multicast communication modes.

According to one aspect of the present invention, a method is provided for outputting a visibility frame in a VLC system. A transmitting-side VLC device determines a visibility frame output type according to a communication mode to be performed. The communication mode and the visibility frame output type are transmitted to a receiving-side VLC device. The receiving-side VLC device is communicated with according to the communication mode and it is determined whether a communication link is released while performing communication according to the communication mode. When the communication link is released, a visibility frame is output according to the visibility frame output type.

According to another aspect of the present invention, a method is provided for outputting a visibility frame in a VLC system. A receiving-side VLC device receives and confirms a communication mode and a visibility frame output type. A transmitting-side VLC is communicated with according to the communication mode and it is determined whether a communication link is released while performing communication according to the communication mode. When the communication link is released, a visibility frame is output according to the visibility frame output type.

According to an additional aspect of the present invention, a VLC device is provided for outputting a visibility frame. The device includes a visible light transceiver for transmitting and receiving a visible light signal. The device also includes a controller for determining a visibility frame output type according to a communication mode to be performed by the VLC device and for transmitting the communication mode and the visibility frame output type to another VLC device through the visible light transceiver.

BRIEF DESCRIPTION OF THE DRAWINGS

The above and other aspects, features and advantages of the present invention will be more apparent from the following detailed description when taken in conjunction with the accompanying drawings, in which:

FIGS. 11A and 11B illustrate fields for setting a service type and an output direction of a visibility frame in a VLC system, according to an embodiment of the present invention;

DETAILED DESCRIPTION OF EMBODIMENTS OF THE PRESENT INVENTION

Figure 1:
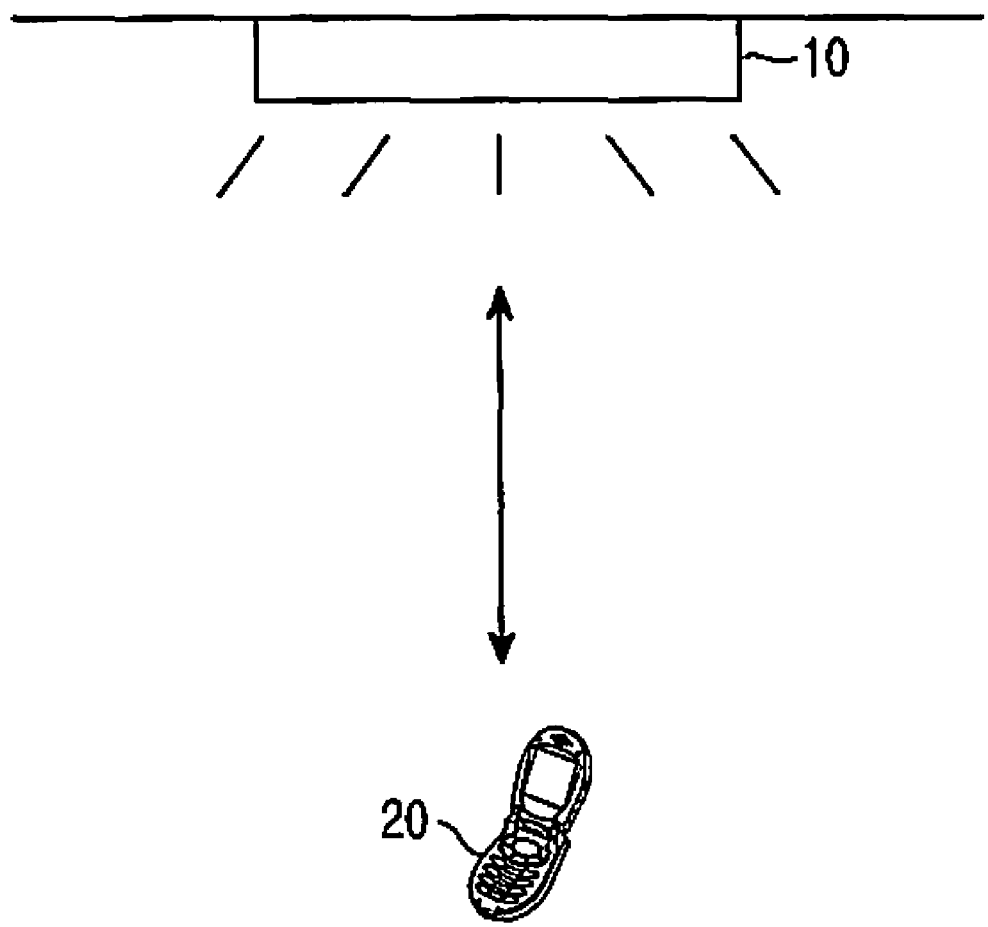
FIG. 1 is a diagram illustrating a general VLC system.
Figure 2A:
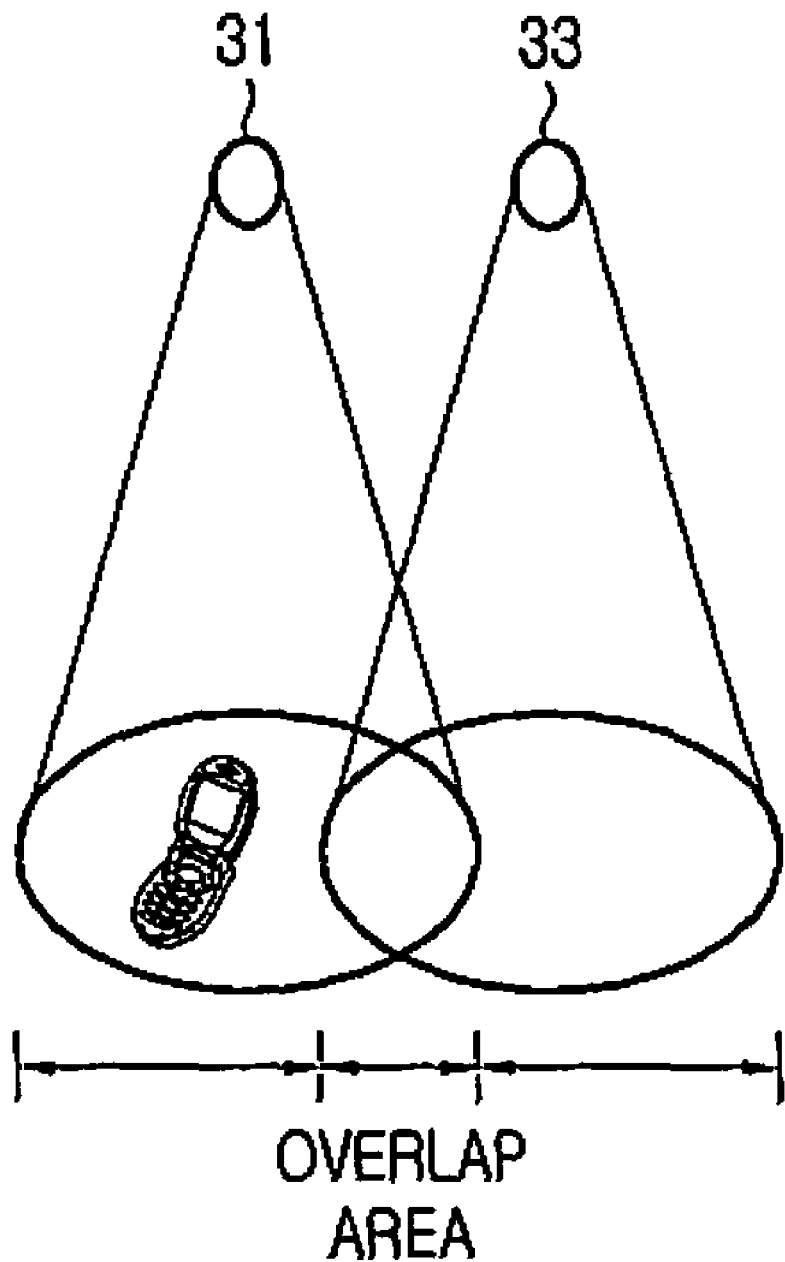
FIGS. 2A to 2C are diagrams illustrating service areas provided by two light sources.
Figure 2B:
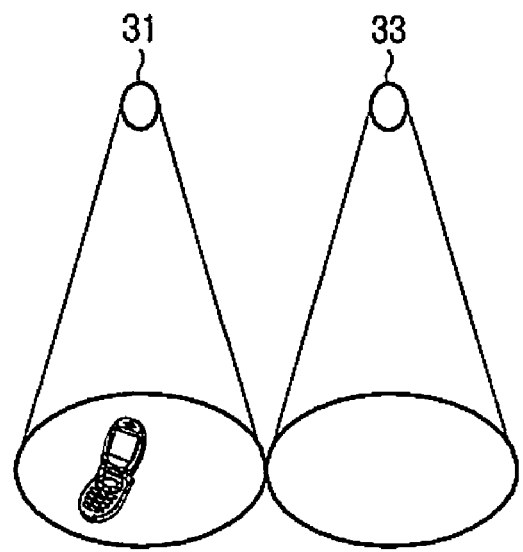
Figure 2C:
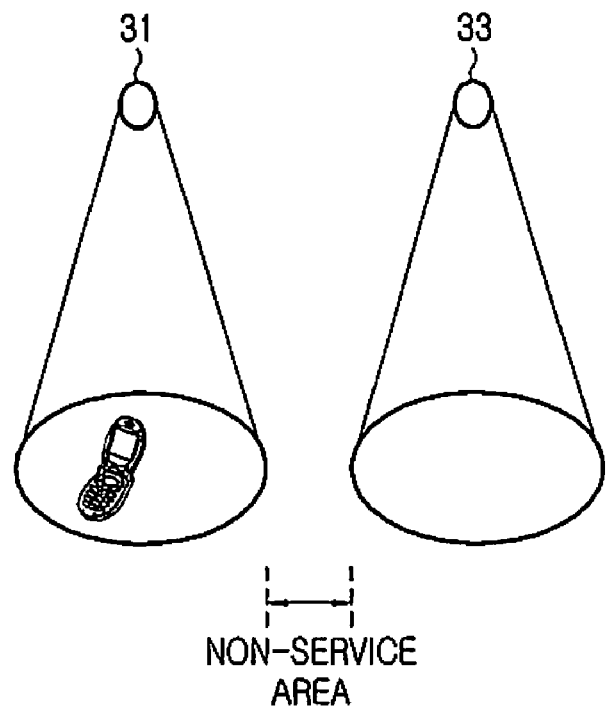

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The present invention provides a method and apparatus for outputting a visibility frame to aid a communication link connection (alignment) by informing a user that a communication link is released and offering visibility to a user, when the communication link is released in a VLC system which can provide unicast, broadcast, and multicast communication modes using a scheme for allocating time slots to a plurality of users.

If a link alignment release occurs while performing VLC in a unicast communication mode, such as a Peer-to-Peer (P2P) scheme, a transmitting-side VLC device may generate a visibility frame for a link connection. If a link connection of a receiving-side VLC device is released while performing VLC by allocating time slots to a plurality of users in a multicast or broadcast communication mode, the receiving-side VLC device of which link connection is released generates a visibility frame. This will be described in greater detail with reference to the accompanying drawings.

Figure 3:
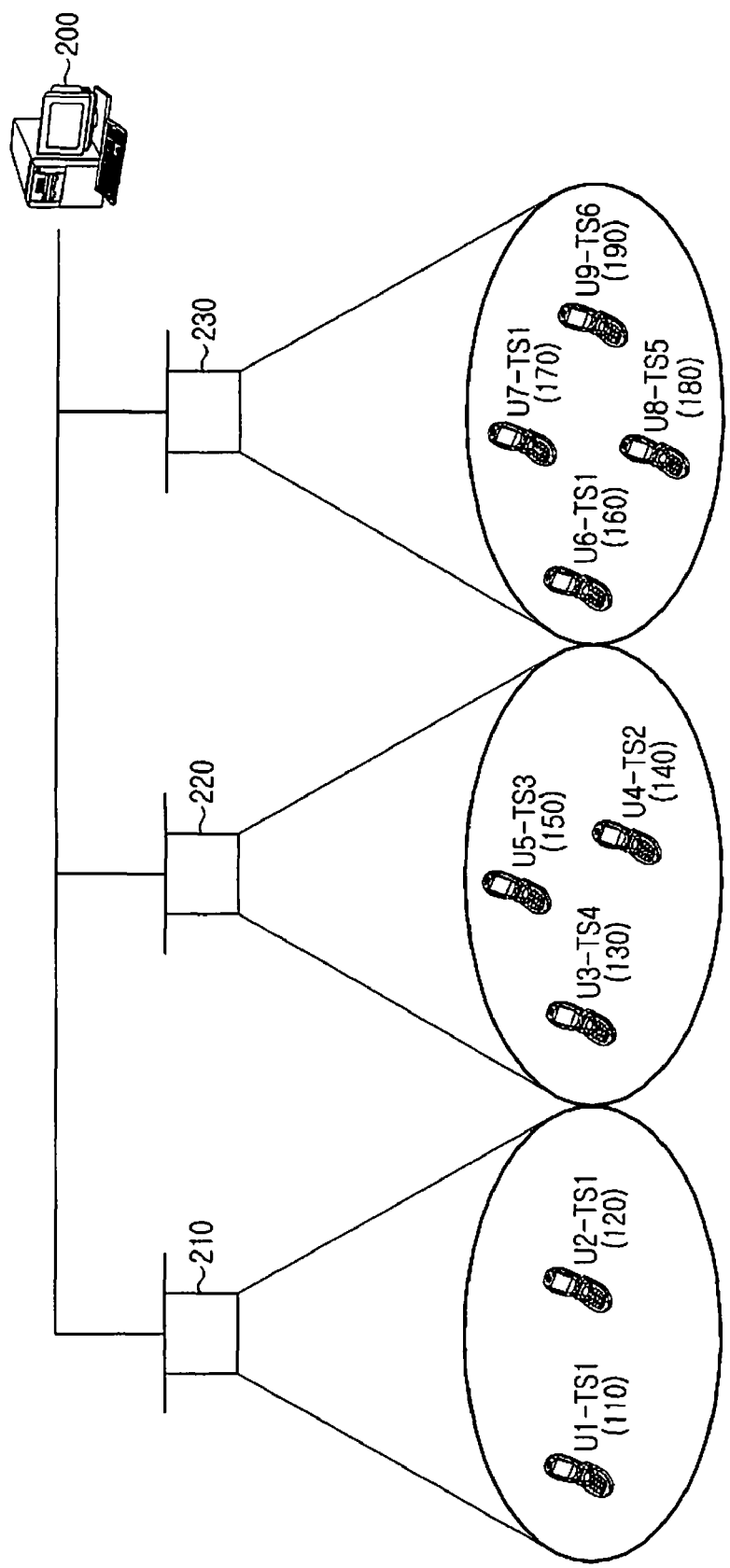
FIG. 3 is a diagram illustrating a configuration of a VLC system, according to an embodiment of the present invention.

FIG. 3 is a diagram illustrating a configuration of a VLC system, according to an embodiment of the present invention.

A VLC system that supports multiple communication modes includes a VLC device 200 for performing VLC through first through third light sources 210, 220 and 230. The VLC system includes VLC terminals 110, 120, 130, 140, 150, 160, 170, 180 and 190, each having a visible light transceiver for transmitting and receiving a visible light signal.

The multiple VLC terminals 110 to 190 transmit and receive data using time slots, such as uplink time slots and downlink time slots, allocated thereto by the VLC device 200. The respective VLC terminals 110 to 190 transmit and receive data only at time slot periods allocated thereto. Referring to FIG. 3, the first and second user terminals 110 and 120 communicate with the first light source 210 using a first time slot TS1. The third user terminal 130 communicates with the second light source 220 using a fourth time slot TS4. The fourth user terminal 140 communicates with the second light source 220 using a second time slot TS2. The fifth user terminal 150 communicates with the second light source 220 using a third time slot TS3. The sixth and seventh user terminals 160 and 170 communicate with the third light source 230 using the first time slot TS1. The eighth user terminal 180 communicates with the third light source 230 using a fifth time slot TS5. The ninth user terminal 109 communicates with the third light source 230 using a sixth time slot TS6.

The respective light sources 210, 220 and 230 have unique light source identifications (IDs) and transmit data received from the VLC device 200 to the VLC terminals 110 to 190 located in their respective service areas. The light sources 210, 220 and 230 transmit uplink data received from the VLC terminals 110 to 190 to the VLC device 200. The light sources 210, 220 and 230 periodically broadcast frame synchronization so that the VLC terminals 110 to 190 located in their respective service areas may establish synchronization therewith.

The VLC device 200 constitutes a cell including any light source according to a user service to be provided by the light source, and allocates time slots, such as uplink time slots or downlink time slots, according to the user service to be provided in each cell, data, and a user located in each cell.

Figure 4A:
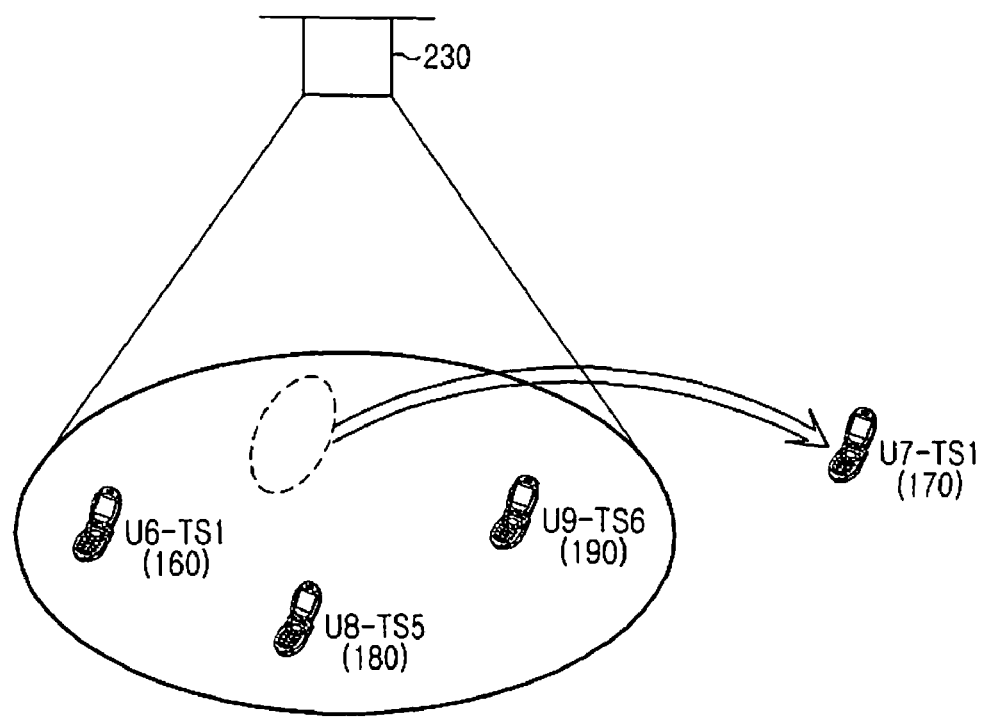
FIG. 4A is a diagram illustrating an example in which a communication link is released during VLC in a multicast mode, according to an embodiment of the present invention.
Figure 4B:
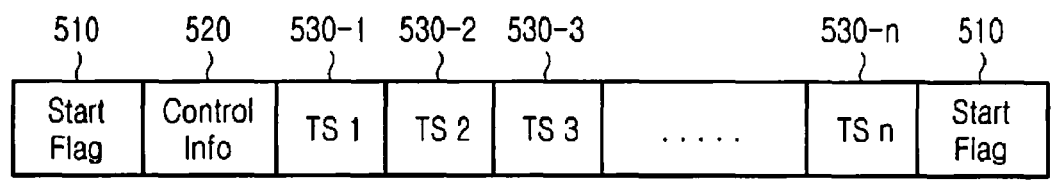
FIG. 4B illustrates a structure of a frame used in a multicast mode.

FIGS. 4A and 4B illustrate an example in which a communication link is released during VLC in a multicast mode and an example of a frame structure used in the multicast mode. FIG. 4A is a diagram illustrating an example in which one VLC terminal 170 leaves of a communication area of a light source 230 while receiving data from the light source 230, when 4 VLC terminals 160, 170, 180 and 190 are within a communication area of the light source 230, resulting in communication link release.

FIG. 4B illustrates a structure of a frame of a visible light signal generated through the light source 230 in a transmitting-side communication device. The frame includes a start flag 510 indicating that the frame is started, a control information field 520 including control information, and a data field consisting of a plurality of time slots 530-1, . . . , 530-n. As shown in FIG. 4A, the sixth and seventh user terminals 160 and 170 perform communication using the first time slot TS1, the eighth user terminal 180 performs communication using the fifth time slot TS5, and the ninth user terminal 190 performs communication using the sixth time slot TS6. If a communication link is released due to the movement of the seventh user terminal 170 or other factors, a transmitting-side communication device should output a visibility frame for a communication link connection through the light source 230. However, since the seventh user terminal 170 should generate a visibility frame only during the first time slot TS1 of a short time slot period, it is difficult for a user to recognize the visibility frame. Moreover, since the sixth user terminal 160 uses the same time slot as the seventh user terminal 170, the output of the visibility frame by the seventh user terminal 170 affects the communication of the sixth user terminal 160 of which a link is not released. In this way, in a broadcast or multicast mode performing communication with a plurality of user terminals, it is difficult for a transmitting-side device to output a visibility frame when a communication link connection is released.

Figure 5A:
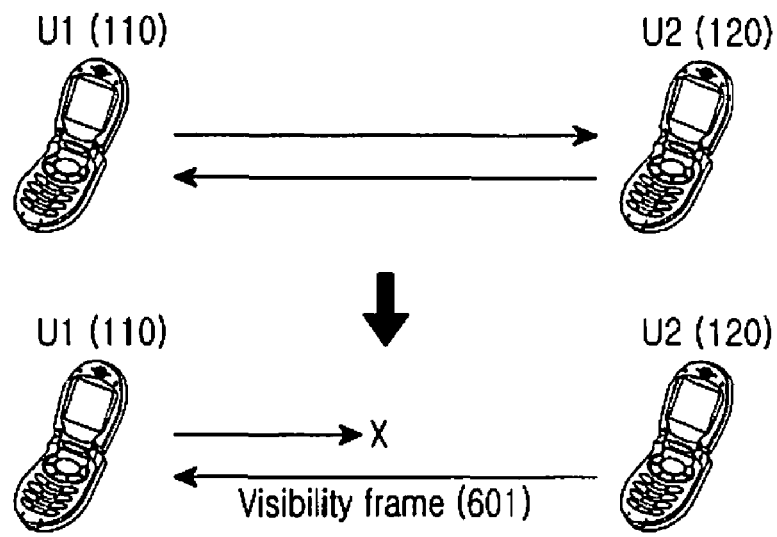
FIG. 5A is a diagram illustrating an example in which a communication link is released during VLC in a unicast mode, according to an embodiment of the present invention.
Figure 5B:
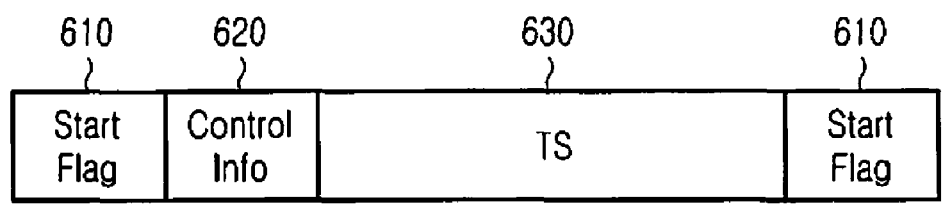
FIG. 5B illustrates a structure of a frame used in a unicast mode.

FIGS. 5A and 5B illustrate an example in which a communication link is released during VLC in a unicast mode and an example of a structure of a frame used in the unicast mode. FIG. 5A illustrates Peer-to-Peer (P2P) communication using VLC. A first user terminal 110 and a second user terminal 120 perform VLC communication. If a visible light signal is not transmitted from the first user terminal 110 to the second user terminal 120 due to communication link release, the second user terminal 120 can generate a visibility frame 601 for a communication link connection.

FIG. 5B illustrates a structure of a frame of a visible light signal transmitted by transmitting-side and receiving-side terminals. The frame includes a start flag 610 representing that the frame is started, a control information field 620 including control information, and a data field 630 consisting of a plurality of time slots. In the unicast mode, since there are a single transmitting-side device and a single receiving-side device, all the time slots are allocated only to one device. If a communication link is released in the unicast mode, both the transmitting-side device and the receiving-side device may output a visibility frame.

Accordingly, a device for outputting a visibility frame according to a communication mode and a service type can be set as listed in Table 1.

TABLE 1

|  | Unicast | Broadcast | Multicast |
|---|---|---|---|
| VLAN (multiple time slot) | Receiving-side | Receiving-side | Receiving-side |
| IB (multiple time slots) | Receiving-side | Receiving-side | Receiving-side |
| P2P/NFC (single time slot) | Both transmitting-side & receiving-side | | |
| P2M (multiple time slots) | Receiving-side | Receiving-side | Receiving-side |
| VB (multiple time slots) | Receiving-side | Receiving-side | Receiving-side |

As shown in Table 1, since Visible Local Area Network (VLAN), Information Broadcast (IB), Point to Multi point (P2M), Vehicular Broadcast (VB) are service types using multiple time slots, it is difficult for a transmitting side to generate a visibility frame as described with reference to FIG. 4A. In such cases, a receiving side may be set to generate a visibility frame. In P2P or Near Field Communication (NFC), since time slots are all allocated to one receiving side, both the transmitting side and the receiving side may generate a visibility frame. If both the transmitting side and the receiving side can generate a visibility frame, it is more desirable that the transmitting side generate a visibility frame.

Figures 6A, 6B:
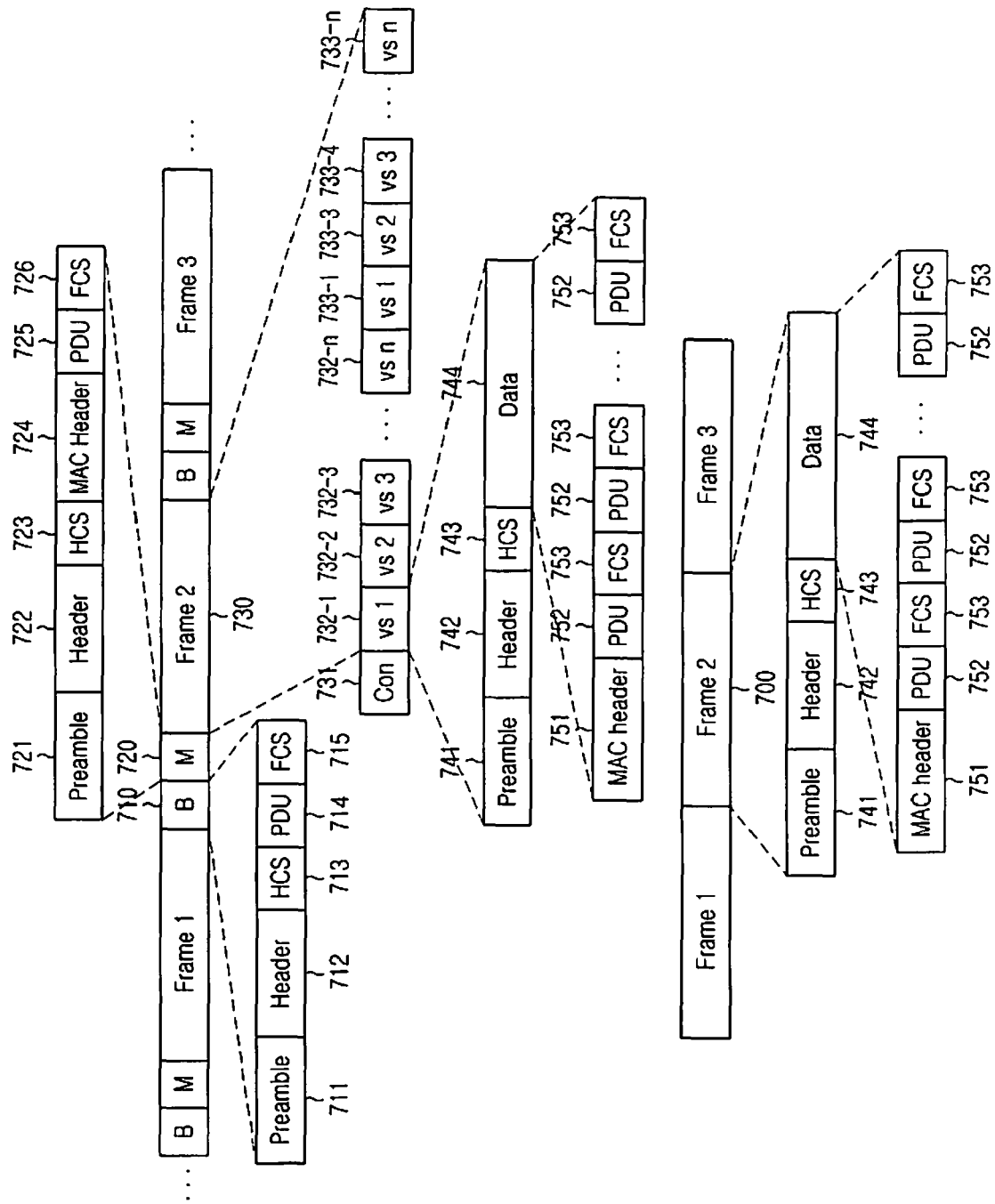
FIGS. 6A and 6B illustrate frames used for VLC, according to an embodiment of the present invention.

FIGS. 6A and 6B illustrate structures of frames used for VLC, according to an embodiment of the present invention. FIG. 6A illustrates a structure of a frame of a time slot allocation scheme for multiple users in VLC, according to an embodiment of the present invention. FIG. 6B illustrates a structure of a frame in a unicast communication mode and shows a simplified form of the structure of the frame shown in FIG. 6A, according to an embodiment of the present invention.

Referring to FIG. 6A, a frame used for VLC includes a beacon field 710 having information for the synchronization and frame interpretation of transmitting and receiving sides, a management field 720 having management information for VLC, and a data frame 730 having data.

The beacon field 710 includes a preamble 711, a header 712, a Header Check Sequence (HCS) 713, a Protocol Data Unit (PDU) 714 and a Frame Check Sequence (FCS) 715. The preamble 711 includes information for determining whether the VLC frame is to perform communication using a plurality of time slots. Accordingly, a receiving side checks the preamble 711 of the beacon field 710 when receiving the VLC frame 700. If the time slots are not used, the receiving side interprets the VLC frame as the frame shown in FIG. 6B.

The management field 720 includes a preamble 721, a header 722, an HCS 723, a Medium Access Control (MAC) header 724, a PDU 725 and an FCS 726. The MAC header 724 includes mode type information indicating whether a communication mode is a unicast mode, a broadcast mode or a multicast mode, and includes information representing a device for outputting a visibility frame.

The data frame 730 includes one contention slot 731, a preset number of downlink virtual slots 732-1, . . . , 732-n, and a preset number of uplink virtual slots 733-1, . . . , 733-n. The virtual slots 732-1, . . . , 732-n and 733-1, . . . , 733-n are individually allocated to a plurality of users during a communication operation as a multicast or broadcast mode.

Each of the virtual slots 732-1, . . . , 732-n and 733-1, . . . , 733-n includes a preamble 741, a header 742, an HCS 743 and a data field 744. The data field 744 includes one MAC header 751, and pairs of a plurality of PDUs 752 and a plurality of FCSs 753.

Referring to FIG. 6B, a VLC frame in a unicast communication mode includes a preamble 741, a header 742, an HCS 743 and a data field 744. The data field 744 includes a MAC header 751, and pairs of a plurality of PDUs 752 and a plurality of FCSs 753.

Figure 7A:
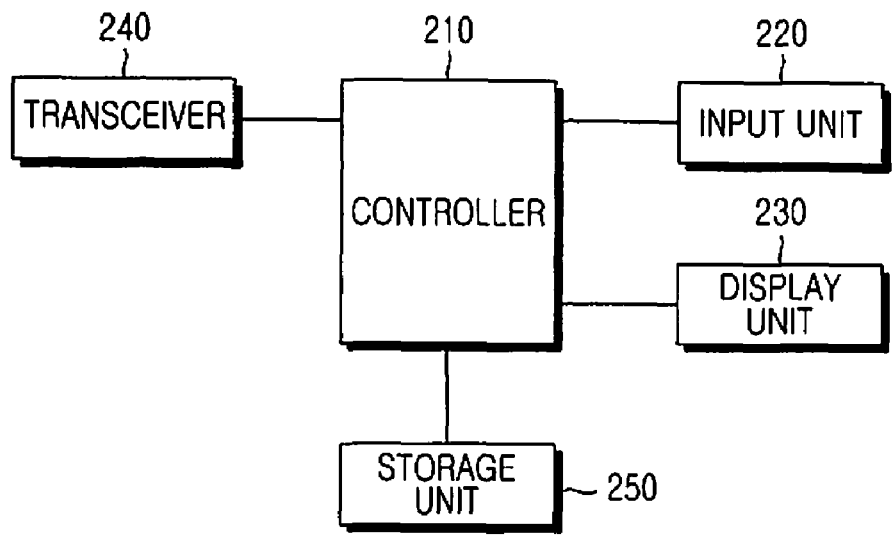
FIG. 7A is a block diagram illustrating a construction of a VLC device, according to an embodiment of the present invention.

FIG. 7A is a block diagram illustrating a construction of a VLC device, according to an embodiment of the present invention. The VLC device includes a controller 210, an input unit 220, a display unit 230, a storage unit 250 and a visible light transceiver 240.

The input unit 220 receives a user manipulation signal such as key input or voice input and transmits the user manipulation signal to the controller 210.

The display unit 230 outputs display data generated in the VLC device. The display unit 230 displays information received from a transmitting-side VLC device or displays a situation when a communication link is released.

The storage unit 250 stores information necessary for an operation of the VLC device.

The controller 210 controls the operation of each constituent element of the VLC device. The controller 210 starts a timer when the VLC device receives data from a light source and transmits an Acknowledgement (ACK) or a response message as a receiving-side terminal in a multicast or broadcast mode. When no response to the ACK or response message is received within a preset time period, the controller 210 controls the VLC transceiver 240 to generate a visibility frame.

The VLC transceiver 240 encodes data to be transmitted when transmitting a visible light signal according to a VLC protocol and transmits the encoded data through a light emitting device. In addition, the VLC transceiver 240 decodes a visible light signal received through a light receiving device when receiving the visible light signal.

Figure 7B:
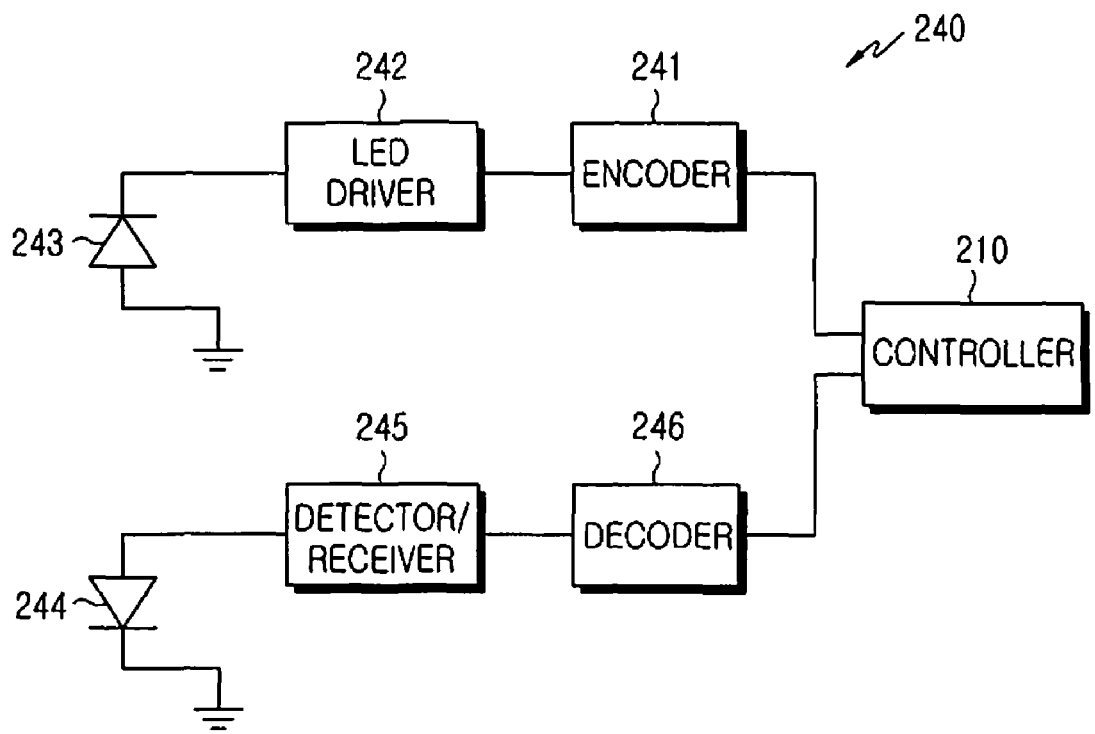
FIG. 7B is a block diagram illustrating a detailed construction of a VLC transceiver of the VLC device shown in FIG. 7A, according to an embodiment of the present invention.

FIG. 7B is a block diagram illustrating a detailed construction of the VLC transceiver 240 of the VLC device shown in FIG. 7A, according to an embodiment of the present invention. The VLC transceiver 240 is connected to the controller 210 and includes an encoder 241, an LED driver 242, an LED 243, a photo diode 244, a detector/receiver 245 and a decoder 246. The encoder 241 encodes transmission data input from the controller 210 and provides the encoded data to the LED driver 242. The LED driver 242 optically modulates data input from the encoder 241 and drives the LED 243 so that transmission data can be transmitted to an external device.

The photo diode 244 senses an optical signal transmitted from the external device, converts the optical signal into an electric signal, and provides the electric signal to the detector/receiver 245. The detector/receiver 245 demodulates the electric signal input from the photo diode 244 into data according to an optical wireless communication scheme and provides the demodulated data to the decoder 246. The decoder 246 decodes the input data and provides the decoded data to the controller 210. The controller 210 processes the data received from the decoder 246.

The VLC device may further include a mobile communication unit (not shown) for performing general wired/wireless communication.

Figure 8:
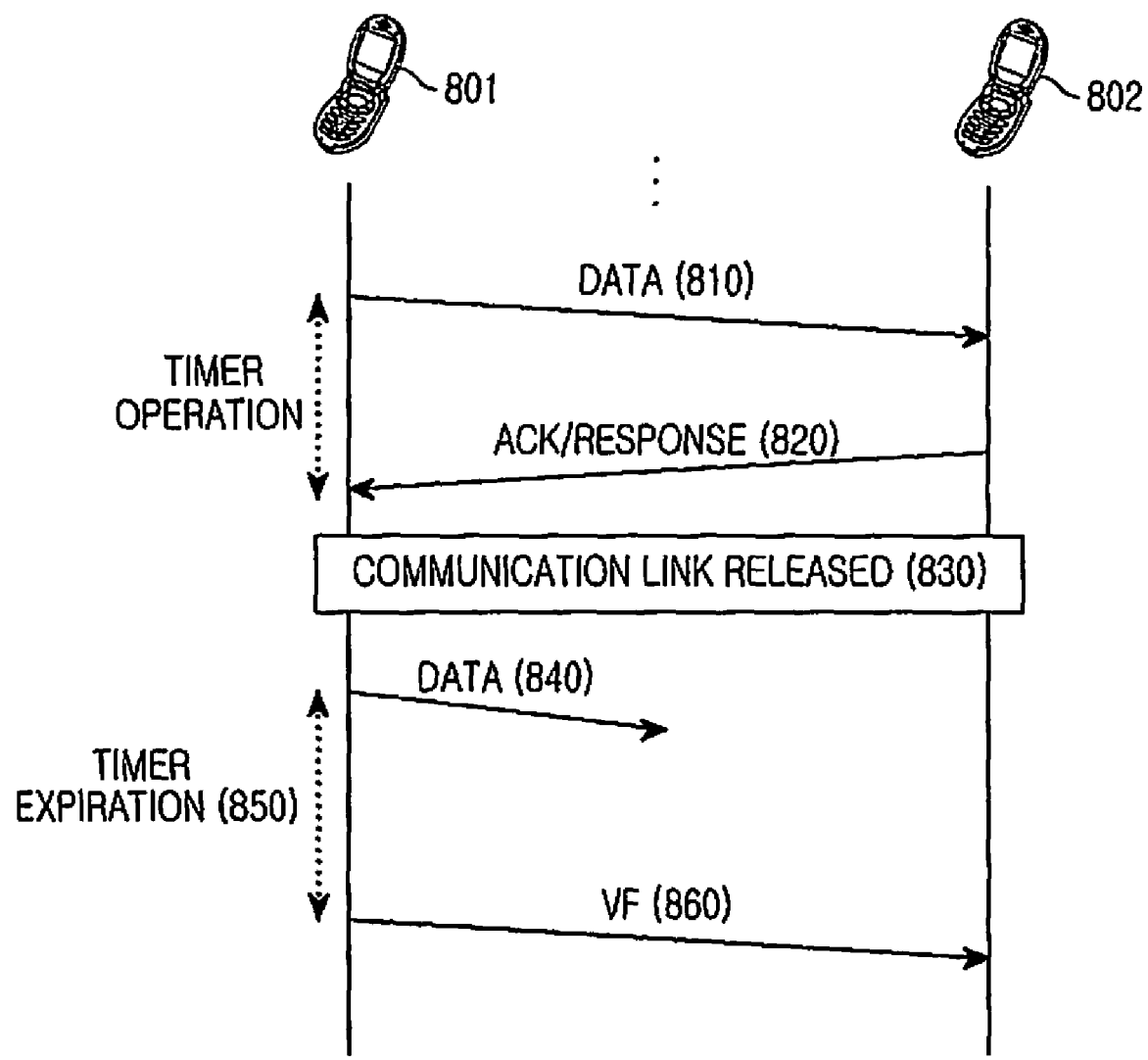
FIG. 8 is a diagram illustrating an operation for outputting a visibility frame by a transmitting-side VLC device when a communication link is released during a VLC operation in a unicast mode, according to an embodiment of the present invention.

FIG. 8 is a diagram illustrating an operation for outputting a visibility frame by a transmitting-side VLC device when a communication link is released during a VLC operation in a unicast mode, according to an embodiment of the present invention. In FIG. 8, two VLC devices 801 and 802 of a terminal type are shown which perform communication in a unicast mode. When a communication link is released during communication, the transmitting-side VLC device 801 is set to generate a visibility frame.

The first terminal 801 transmits data to the second terminal 802 during VLC in step 810. The first terminal 801 transmits data and simultaneously starts a timer for determining whether a communication link is released. When no ACK or response message to a transmitted signal is received before expiry of the timer, it is determined that a communication link is released.

The second terminal 802 transmits an ACK or response message to received data to the first terminal 801 in step 820. In this case, since the ACK or response message is received before the timer has elapsed, it is determined that a signal is normally transmitted and received.

If a communication link is released due to external factors or movement of the VLC device in step 830, data transmitted by the first terminal 801 is not transmitted to the second terminal 802 in step 840. In step 840, the first terminal 801 starts the timer. In this case, however, no ACK or response message is received before expiry of the timer. Therefore, the first terminal 801 generates and transmits a Visibility Frame (VF) in step 860.

Figure 9:
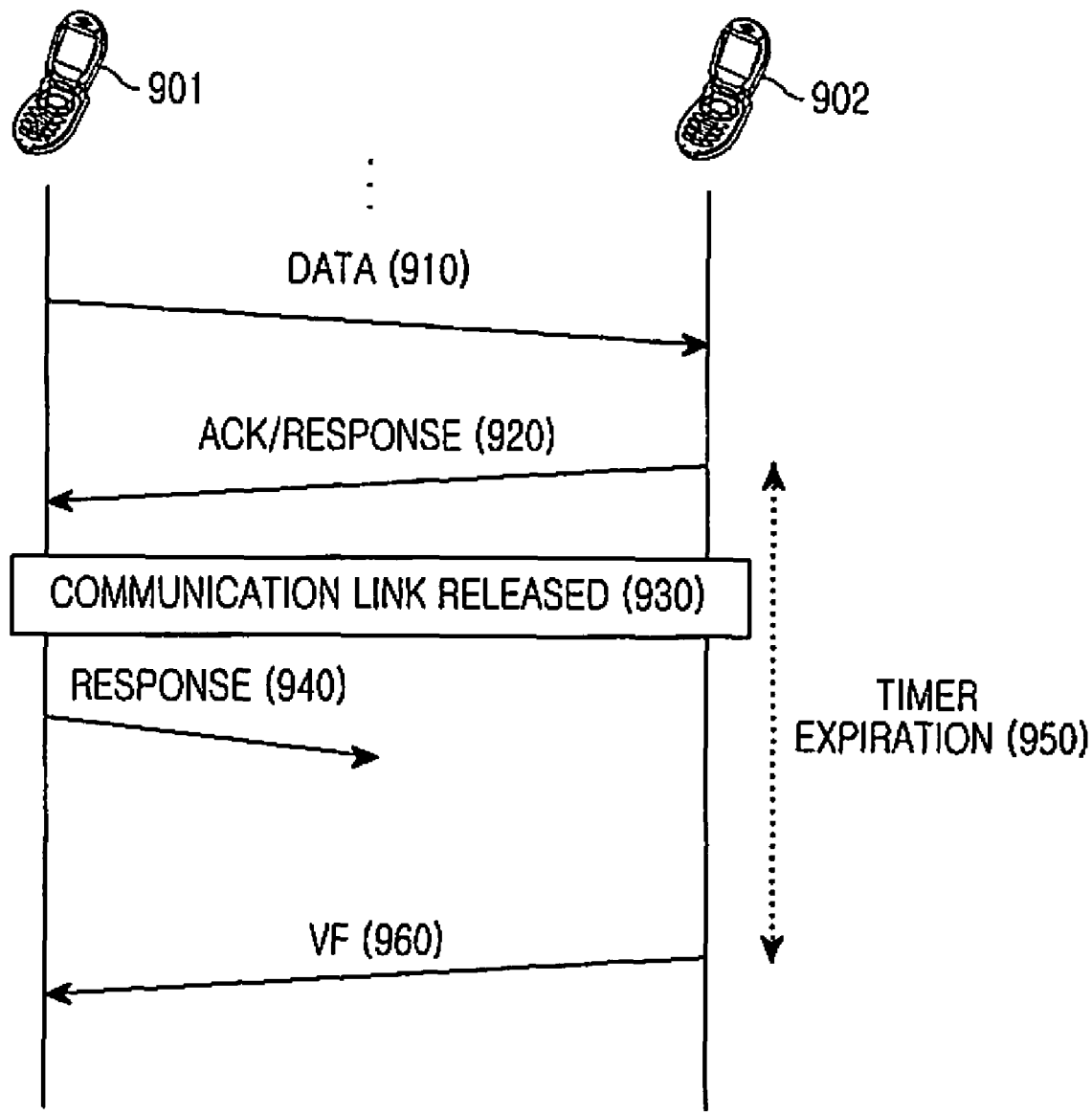
FIG. 9 is a diagram illustrating an operation for outputting a visibility frame by a receiving-side VLC device when a communication link is released during a VLC operation in a unicast mode, according to an embodiment of the present invention.

FIG. 9 is a diagram illustrating an operation for outputting a visibility frame by a receiving-side VLC device when a communication link is released during a VLC operation in a unicast mode, according to an embodiment of the present invention. In FIG. 9, two VLC devices 901 and 902 of a terminal type perform communication in a unicast mode, and when a communication link is released while performing communication, the receiving-side VLC device 902 is set to generate a VF.

The first terminal 901 transmits data to the second terminal 902 during VLC in step 910.

The second terminal 902 transmits an ACK or response message to receive data to the first terminal 901 in step 920. The second terminal 902 transmits the ACK or response message and simultaneously starts a timer for determining whether a communication link is released. When a receiving-side VLC device 902 is set to generate a VF, if the receiving-side device transmits an ACK or response message to a transmitting-side VLC device, the transmitting-side device which has transmitted initial data is set to transmit a response to the ACK or response message to the receiving-side VLC device. Accordingly, if no response to the transmitted message is received before expiry of the timer, which is started when transmitting the ACK or response message, the receiving-side device determines that a communication link is released.

If a communication link is released due to external factors or movement of the VLC device in step 930, a response transmitted by the first terminal 901 is not transmitted to the second terminal 902 in step 940. Then, no response is received before expiry of the timer and the second terminal 902 generates a VF in step 960.

Figure 10:
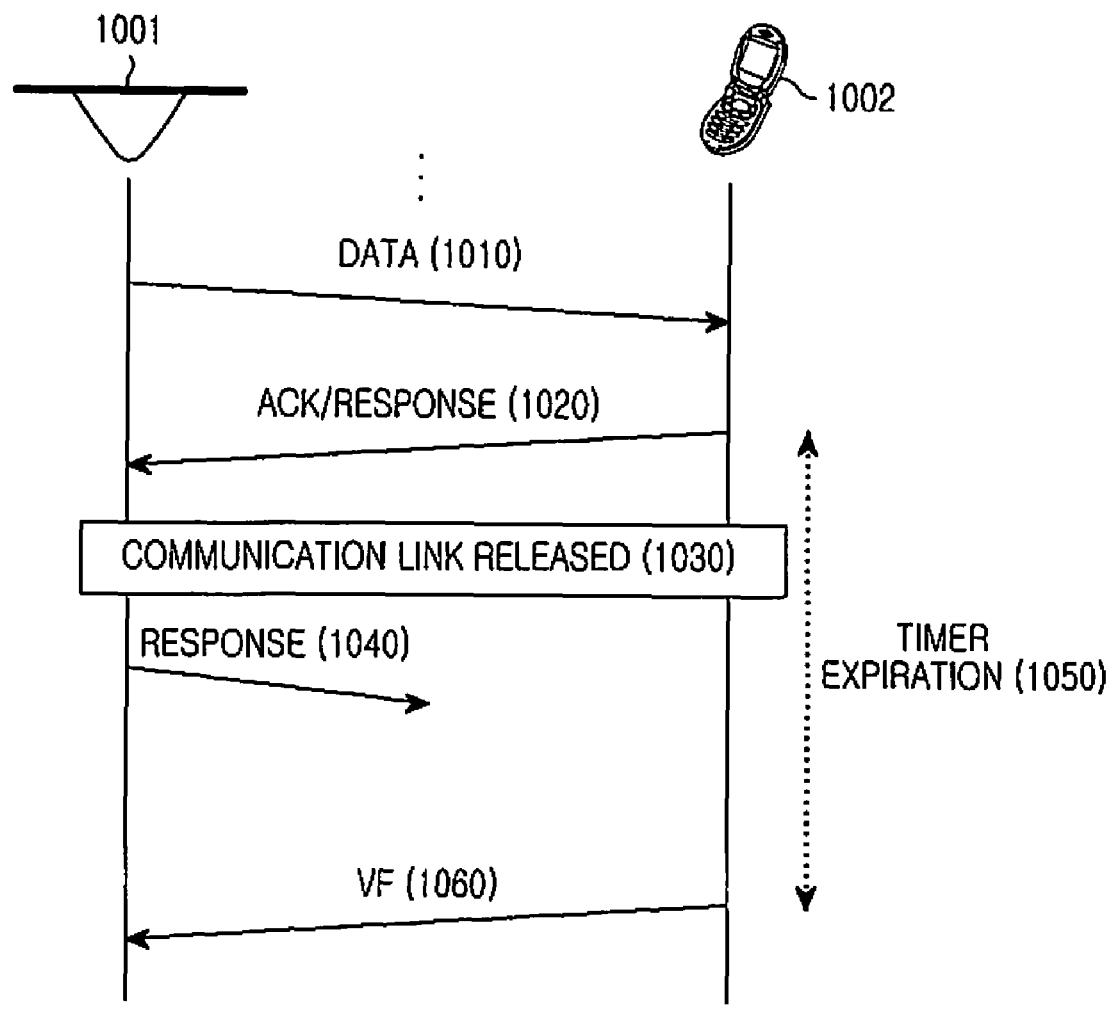
FIG. 10 is a diagram illustrating an operation for outputting a visibility frame when a communication link is released during a VLC operation in a broadcast mode or multicast mode, according to an embodiment of the present invention.

FIG. 10 is a diagram illustrating an operation for outputting a visibility frame when a communication link is released during a VLC operation in a broadcast mode or multicast mode, according to an embodiment of the present invention. In FIG. 10, a VLC device 1001, which performs VLC using a light source fixedly installed at one location, performs communication with a VLC device 1002 of a mobile terminal type in a multicast or broadcast mode. When a communication link is released from one receiving-side VLC device 1002 while performing communication, the receiving-side VLC device 1002 is set to generate a VF.

The transmitting-side communication device 1001 transmits data to the receiving-side terminal 1002 during VLC in step 1010.

The receiving-side terminal 1002 transmits an ACK or response message to received data to the transmitting-side VLC device 1001 in step 1020. The receiving side terminal 1002 transmits the ACK or response message and simultaneously starts a timer for determining whether a communication link is released. When the receiving-side VLC device (receiving-side terminal) 1002 is set to generate a VF, if the receiving-side device transmits an ACK or response message to received data to the transmitting-side device, the transmitting-side device which has transmitted initial data is set to transmit a response to the ACK or response message to the receiving-side device. Accordingly, the receiving-side device determines that a communication link is released when no response to the transmitted message is received before expiry of the timer, which is started when transmitting the ACK or response message.

If a communication link is released due to external factors or movement of the VLC device in step 1030, a response transmitted by the transmitting-side VLC device 1001 is not transmitted to the second terminal 1002 in step 1040. Then, no response is received before expiry of the timer and the second terminal 1002 generates a VF in step 1060.

FIGS. 11A and 11B illustrate fields for setting a service type and an output direction of a VF in a VLC system, according to an embodiment of the present invention. Data shown in FIG. 11A is included in the MAC header 724 of the management field 720 shown in FIG. 6A. In this case, the MAC header 724 includes a service type 1101 indicating a communication mode and a VF information type 1102 indicating an output type of a VF. Two bits are allocated to the service type 1101 in which '00', '01' and '11' represent a unicast mode, a broadcast mode and a multicast mode, respectively. Three bits are allocated to the VF information type 1102 in which '000', '001', and '011' indicate transmitting-side output, receiving-side output, and both transmitting-side and receiving-side output, respectively.

Data shown in FIG. 11B is included in the MAC header 751 of the data frame 744 shown in FIG. 6A. Similarly to FIG. 11A, the MAC header 751 further includes a service type 1101 indicating a communication mode and a VF information type 1102 indicating an output type of a VF.

Figure 12:
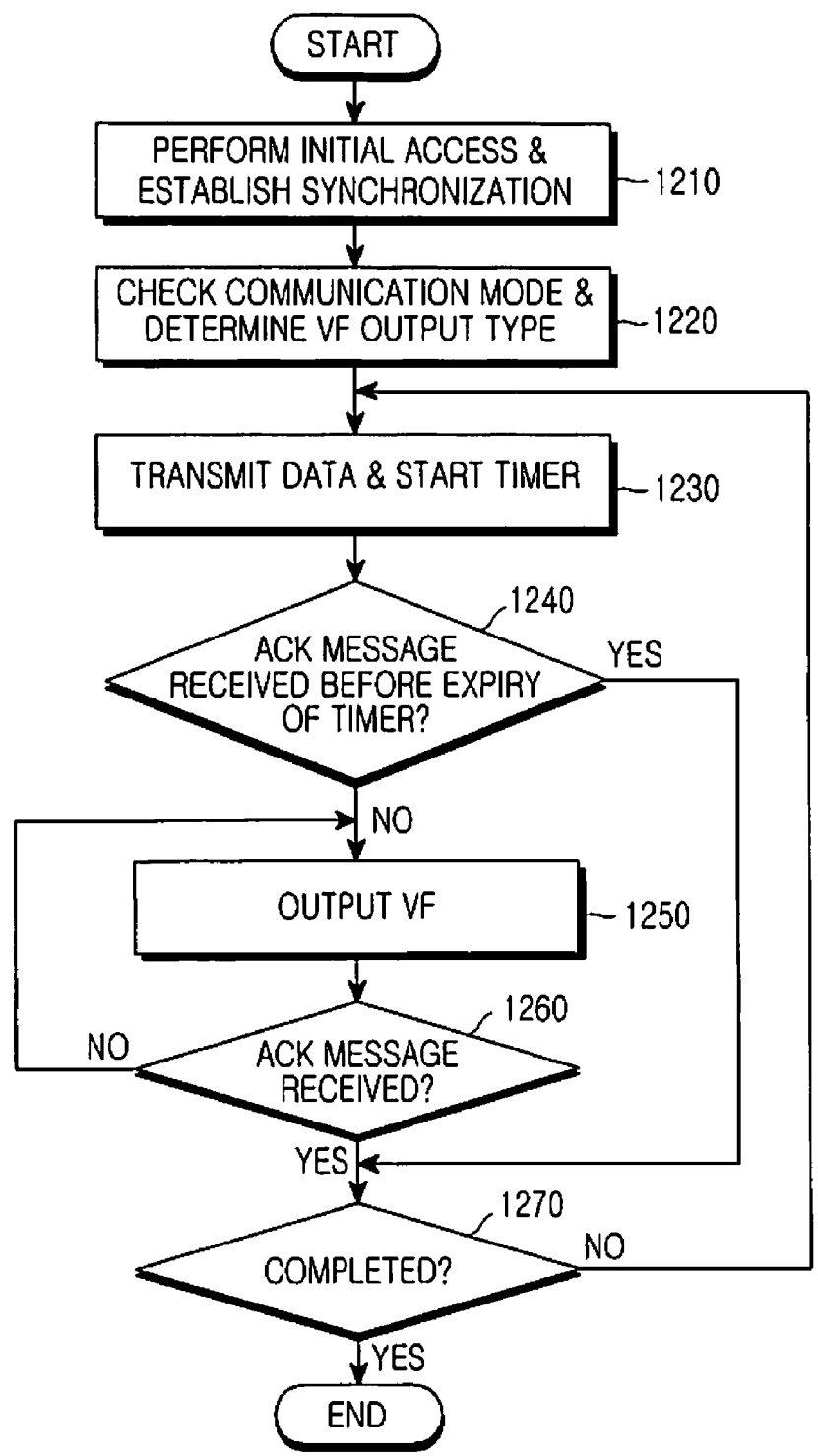
FIG. 12 is a flow chart illustrating an operation of a transmitting-side terminal during VLC in a unicast mode, according to an embodiment of the present invention.

FIG. 12 is a flow chart illustrating an operation of a transmitting-side terminal during VLC in a unicast mode, according to an embodiment of the present invention. In FIG. 12, an operation of a transmitting-side terminal is shown when two VLC devices of a mobile terminal type perform VLC in a unicast mode.

The transmitting-side terminal performs an initial access and establishes synchronization with a receiving-side terminal in step 1210. The transmitting-side terminal checks a communication mode and determines a VF output type in step 1220. The communication mode uses a unicast mode and the VF output type is determined as transmitting-side output first. The communication mode and VF output type may be set using the service type 1101 and the VF information type 1102 included in the MAC header shown in FIGS. 11A and 11B in the VLC frame of FIG. 6B. The receiving-side device may confirm the communication mode and VF output type by checking an associated part in the VLC frame.

The transmitting-side terminal transmits data to the receiving-side terminal and simultaneously starts a timer for determining whether a communication link is released in step 1230. The transmitting-side terminal determines whether an ACK message is received before expiry of the timer in step 1240. In no ACK message is received before expiry of the timer, the transmitting-side terminal determines that the communication link is released and generates a VF in step 1250. The transmitting-side terminal determines whether an ACK message is received in step 1260. If no ACK message is received, the transmitting-side terminal returns to step 1250 to continue to output a VF for a communication link connection. If the ACK message is received due to restoration of the communication link, the transmitting-side terminal determines whether to complete transmission and reception operation in step 1270. If the transmission and reception operation is not completed, the transmitting-side terminal returns to step 1230 to continue to transmit data.

If the ACK message is received before expiry of the timer in step 1240, it is determined that the transmission and reception operation is normally performed and the transmitting-side terminal proceeds to step 1270.

Figure 13:
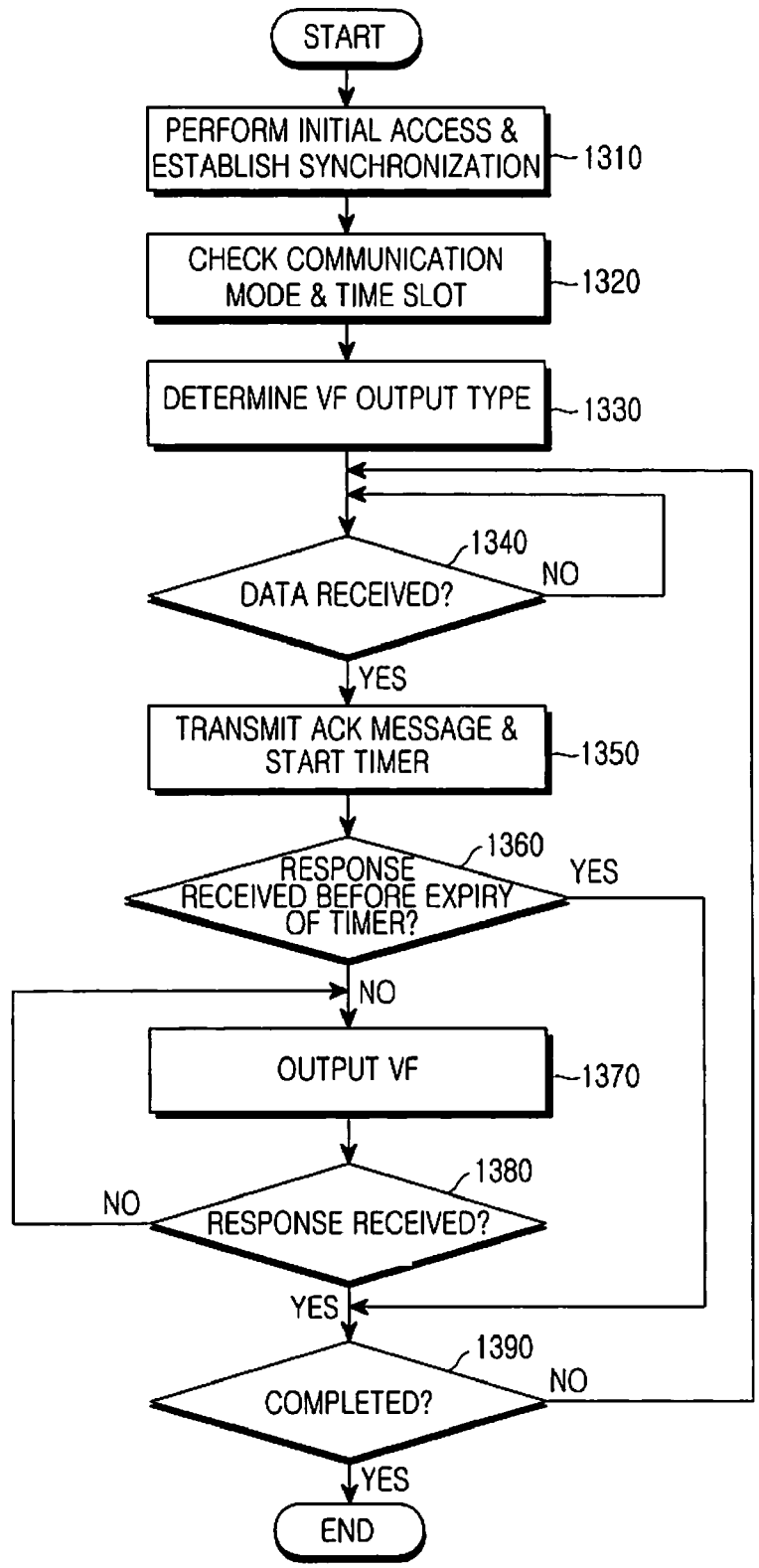
FIG. 13 is a flow chart illustrating an operation of a receiving-side terminal during VLC in a multicast mode or broadcast mode, according to an embodiment of the present invention.

FIG. 13 is a flow chart illustrating an operation of a receiving-side terminal during VLC in a multicast mode or a broadcast mode, according to an embodiment of the present invention. In FIG. 13, an operation of a receiving-side terminal is shown when a transmitting-side VLC device performs VLC with plurality of receiving-side VLC devices of a terminal type in a multicast or broadcast mode. The transmitting-side VLC device may be a device for performing VLC using a light source, which is fixedly installed at one position or may be a general mobile terminal.

The receiving-side terminal performs an initial access and establishes synchronization with the transmitting-side terminal in step 1310. The receiving-side terminal checks a communication mode and a time slot allocated thereto in step 1320. The receiving-side terminal determines a VF output type in step 1330. The communication mode uses a multicast or broadcast mode and the VF output type is determined as receiving-side output first. The communication mode and VF output type may be confirmed using information included in the MAC header of the VLC frame transmitted by the transmitting-side terminal.

The receiving-side terminal determines whether data is received from the transmitting-side terminal in step 1340. If no data is received, the receiving-side terminal awaits data to be received. If data is received, the receiving-side terminal transmits an ACK or response message to the received data to the transmitting side and simultaneously starts a timer for determining whether a communication link is released in step 1350. The receiving-side terminal determines whether a response to the transmitted ACK message is received before expiry of the timer in step 1360. In no response is received before expiry of the timer, the receiving-side terminal determines that the communication link is released and generates a VF in step 1370. The receiving-side terminal determines whether a response to the transmitted ACK message is received in step 1380. If no response is received, the receiving-side terminal returns to step 1370 to continue to output a VF for a communication link connection. If the response is received due to restoration of the communication link, the receiving-side terminal determines whether to complete transmission and reception operation in step 1390. If the transmission and reception operation is not completed, the receiving-side terminal returns to step 1340 to continue to receive data.

If the response is received before expiry of the timer in step 1360, it is determined that the transmission and reception operation is normally performed and the transmitting-side terminal proceeds to step 1390.

The present invention can output a VF for informing that a communication link is disconnected when the communication link connection is released in a multi-mode VLC system, which supports unicast, broadcast and multicast modes.

Specifically, if a communication link is released from one of a plurality of terminals receiving data through a time slot allocated from one light source in a broadcast or multicast communication mode, a receiving-side informs that the communication link is released and outputs a VF for aiding a communication link connection, thereby performing the communication link connection without an effect on communication of the other terminals.

In a unicast mode such as P2P, both a transmitting-side terminal and a receiving-side terminal may output a VF.

The VLC system of the present invention can effectively perform unicast, broadcast and multicast communication modes and thus can provide communication services using VLC, such as VLAN, IB, P2M, VB, etc.

While the invention has been shown and described with reference to certain embodiments thereof, it will be understood by those skilled in the art that various changes in form and detail may be made therein without departing from the scope and spirit of the invention as disclosed in the accompanying claims.

What is claimed is:

1. A method for outputting a visibility frame in a Visible Light Communication (VLC) system, the method comprising the steps of:

determining, by a transmitting-side VLC device, a visibility frame output type according to a communication mode to be performed;

transmitting the communication mode and the visibility frame output type to a receiving-side VLC device;
communicating with the receiving-side VLC device according to the communication mode and determining whether a communication link is released while performing communication according to the communication mode; and
if the communication link is released, outputting a visibility frame according to the visibility frame output type.

2. The method of claim 1, wherein transmitting the communication mode and the visibility frame output type comprises:
providing data representing the communication mode and the visibility frame output type in a Medium Access Control (MAC) header within a management field of a visibility frame; and
transmitting the visibility frame with the data representing the communication mode and the visibility frame output type to the receiving-side VLC device.

3. The method of claim 1, wherein determining the visibility frame output type comprises:
when the communication mode is a multicast communication mode or a broadcast communication mode in which the transmitting-side VLC device performs communication with a plurality of receiving-side VLC devices, determining the visibility frame output type such that the receiving-side VLC device outputs the visibility frame; and
when the communication mode is a unicast communication mode in which the transmitting-side VLC device performs communication with only the receiving-side VLC device, determining the visibility frame output type such that the transmitting-side VLC device outputs the visibility frame.

4. The method of claim 3, wherein determining whether the communication link is released comprises:
when the visibility frame output type is determined such that the transmitting-side VLC device outputs the visibility frame, transmitting, by the transmitting-side VLC device, data to the receiving-side VLC device and simultaneously starting a timer for determining whether a communication link is released; and
when no response message to the transmitted data is received before expiry of the timer, determining, by the transmitting-side VLC device, that the communication link is released.

5. The method of claim 3, wherein the visibility frame includes a beacon field having information for synchronization and frame interpretation of transmitting-side and receiving-side VLC devices, a management field having management information for VLC, and a data frame having data.

6. The method of claim 5, wherein the beacon field includes a preamble, a header, a Header Check Sequence (HCS), a Protocol Data Unit (PDU) and a Frame Check Sequence (FCS), the management field includes a preamble, a header, an HCS, a Medium Access Control (MAC) header, a PDU and an FCS, and the data frame includes one contention slot, a preset number of downlink virtual slots and a preset number of uplink virtual slots.

7. The method of claim 6, wherein each of the virtual slots includes a preamble, a header, an HCS and a data field, and the data field of the virtual slots includes one MAC header, and a preset number of pairs of a plurality of PDUs and a plurality of FCSs.

8. A method for outputting a visibility frame in a Visible Light Communication (VLC) system, the method comprising the steps of:
receiving and confirming, by a receiving-side VLC device, a communication mode and a visibility frame output type;
communicating with a transmitting-side VLC according to the communication mode and determining whether a communication link is released while performing communication according to the communication mode; and
when the communication link is released, outputting a visibility frame according to the visibility frame output type.

9. The method of claim 8, wherein receiving and confirming the communication mode and the visibility frame output type comprises:
receiving, by the receiving-side VLC device, a visibility frame from a transmitting-side VLC; and
confirming the communication mode and the visibility frame output type by checking a Medium Access Control (MAC) header within a control field of the visibility frame from the transmitting-side VLC.

10. The method of claim 8, wherein the visibility frame output type is determined such that the receiving-side VLC device outputs the visibility frame when the communication mode is a multicast or broadcast communication mode in which the transmitting-side VLC device performs communication with a plurality of receiving-side VLC devices, and such that the transmitting-side VLC device outputs the visibility frame when the communication mode is a unicast communication mode in which the transmitting-side VLC device performs communication with only the receiving-side VLC device.

11. The method of claim 10, wherein determining whether the communication link is released comprises:
when the visibility frame output type is determined such that the receiving-side VLC device outputs the visibility frame, receiving, by the receiving-side VLC device, data from the transmitting-side VLC device;
transmitting, by the receiving-side VLC device, a response message to the received data to the transmitting-side VLC device and simultaneously starting a timer for determining whether the communication link is released; and
when no response to the response message is received before expiry of the timer, determining, by the receiving-side VLC device, that the communication link is released.

12. A Visible Light Communication (VLC) device for outputting a visibility frame, comprising:
a visible light transceiver for transmitting and receiving a visible light signal; and
a controller for determining a visibility frame output type according to a communication mode to be performed by the VLC device, and for transmitting the communication mode and the visibility frame output type to another VLC device through the visible light transceiver.

13. The VLC device of claim 12, wherein, when the VLC device operates as a receiving-side VLC device, the controller receives and confirms the communication mode and the visibility frame output type, performs communication according to the communication mode, determines whether a communication link is released while performing communication according to the communication mode, and when the communication link is released, outputs a visibility frame according to the visibility frame output type.

14. The VLC device of claim 13, further comprising;
an input unit for receiving a user manipulation signal and transmitting the user manipulation signal to the controller;

a display unit for outputting display data generated in the VLC device; and a storage unit for storing information necessary for an operation of the VLC device.

15. The VLC device of claim 13, wherein the visible light transceiver comprises:

an encoder for encoding transmission data input from the controller and providing the encoded data to a driver;

the driver for optically modulating data input from the encoder and driving a light emitting element so that transmission data can be transmitted to an external device;

the light emitting element for converting the transmission data into an optical signal by the control of the driver;

a light receiving element for sensing an optical signal transmitted from the external device, converting the optical signal into an electric signal, and providing the electric signal to a detector/receiver;

the detector/receiver for demodulating the electric signal input from the light receiving element into data according to an optical wireless communication scheme and providing the demodulated data to a decoder; and the decoder for decoding input data and providing the decoded data to the controller.

16. The VLC device of claim 13, wherein transmitting the communication mode and the visibility frame output type by the controller comprises:

providing data representing the communication mode and the visibility frame output type in a Medium Access Control (MAC) header within a management field of the visibility frame and transmitting the visibility frame to the other VLC device.

17. The VLC device of claim 16, wherein receiving and confirming the communication mode and the visibility frame output type by the controller comprises:

receiving the visibility frame and confirming the communication mode and the visibility frame output type by checking the MAC header within the management field of the visibility frame.

18. The VLC device of claim 13, wherein determining the visibility frame output type by the controller comprises:

when the communication mode is a multicast communication mode or a broadcast communication mode in which one transmitting-side VLC device performs communication with a plurality of receiving-side VLC devices, determining the visibility frame output type such that the receiving-side VLC device outputs the visibility frame; and when the communication mode is a unicast communication mode in which the transmitting-side VLC device performs communication with the receiving-side VLC device, determining the visibility frame output type such that the transmitting-side VLC device outputs the visibility frame.

19. The VLC device of claim 18, wherein determining, by the controller, whether the communication link is released comprises:

when the visibility frame output type is determined such that the receiving-side VLC device outputs the visibility frame, receiving, by the receiving-side VLC device, data from the transmitting-side VLC device;

transmitting, by the receiving-side VLC device, a response message to the received data to the transmitting-side VLC device and simultaneously starting a timer for determining whether the communication link is released; and when no response to the response message is received before expiry of the timer, determining that the communication link is released.

20. The VLC device of claim 18, wherein determining, by the controller, whether a communication link is released comprises:

when the visibility frame output type is determined such that the transmitting-side VLC device outputs the visibility frame, transmitting, by the transmitting-side VLC device, data to the receiving-side VLC device and simultaneously starting a timer for determining whether a communication link is released; and when no response message to the transmitted data is received before expiry of the timer, determining that the communication link is released.

* * * * *